US012622344B2

(12) United States Patent
Maro

(10) Patent No.: US 12,622,344 B2
(45) Date of Patent: *May 12, 2026

(54) FRAME ADJUSTMENT CONTROL SYSTEM AND METHOD FOR DOWNFORCE

(71) Applicant: Deere & Company, Moline, IL (US)

(72) Inventor: Randall A. Maro, Davenport, IA (US)

(73) Assignee: Deere & Company, Moline, IL (US)

( * ) Notice: Subject to any disclaimer, the term of this patent is extended or adjusted under 35 U.S.C. 154(b) by 1190 days.

This patent is subject to a terminal disclaimer.

(21) Appl. No.: 17/387,067

(22) Filed: Jul. 28, 2021

(65) Prior Publication Data

US 2022/0053684 A1 Feb. 24, 2022

Related U.S. Application Data

(60) Provisional application No. 63/066,922, filed on Aug. 18, 2020.

(51) Int. Cl.
| | |
|---|---|
| *A01C 7/20* | (2006.01) |
| *A01B 63/00* | (2006.01) |
| *A01B 79/02* | (2006.01) |

(52) U.S. Cl.
CPC ............ *A01C 7/205* (2013.01); *A01B 63/008* (2013.01); *A01B 79/02* (2013.01); *A01C 7/203* (2013.01)

(58) Field of Classification Search
CPC ........... A01C 7/205; A01C 7/08; A01C 7/203; A01B 63/008; A01B 79/02
See application file for complete search history.

(56) References Cited

U.S. PATENT DOCUMENTS

| | | | |
|---|---|---|---|
| 4,721,168 | A | 1/1988 | Kinzenbaw |
| 6,044,916 | A | 4/2000 | Hundeby |
| | | (Continued) | |

FOREIGN PATENT DOCUMENTS

| | | | | |
|---|---|---|---|---|
| WO | 2018109545 A1 | 6/2018 | | |
| WO | WO-2021089197 A1 | * | 5/2021 | ......... A01B 63/1112 |

OTHER PUBLICATIONS

Extended European Search Report and Written Opinion issued in European Patent Application No. 21191248.0, dated Jan. 19, 2022, in 11 pages.

(Continued)

*Primary Examiner* — Christopher J Sebesta
*Assistant Examiner* — Joel F. Mitchell
(74) *Attorney, Agent, or Firm* — Taft Stettinius & Hollister LLP; Stephen F. Rost

(57) ABSTRACT

An agricultural machine includes a main frame, a rotate frame, and a row unit. A control method for the machine includes: selecting at least one of: (i) a desired position-based relationship between a portion of the rotate frame and the row unit, and (ii) a desired downforce of the row unit; determining at least one of: (i) an actual position-based relationship defined between the rearward portion of the rotate frame and the row unit, and (ii) an actual downforce of the row unit; and adjusting at least one of: (i) the actual position-based relationship toward the desired position-based relationship, and (ii) the actual downforce of the row unit toward the desired downforce of the row unit; wherein adjusting the actual position-based relationship and adjusting the actual downforce of the row both include moving the rotate frame relative to the main frame of the agricultural machine.

15 Claims, 12 Drawing Sheets

(56)        References Cited

U.S. PATENT DOCUMENTS

| | | | |
|---|---|---|---|
| 8,448,717 B2 | 5/2013 | Adams et al. | |
| 8,634,992 B2 * | 1/2014 | Sauder | A01B 63/008 |
| | | | 111/194 |
| 9,433,142 B2 | 9/2016 | Bergen et al. | |
| 9,554,504 B2 | 1/2017 | Houck | |
| 10,701,854 B2 | 7/2020 | Gutknecht | |
| 2017/0006761 A1 | 1/2017 | Anderson et al. | |
| 2017/0202132 A1 | 7/2017 | Maust et al. | |
| 2019/0380259 A1 * | 12/2019 | Frank | A01C 5/068 |
| 2020/0084951 A1 | 3/2020 | Fanshier et al. | |
| 2020/0404837 A1 * | 12/2020 | Thompson | A01C 7/205 |
| 2022/0053685 A1 * | 2/2022 | Maro | A01B 63/008 |

OTHER PUBLICATIONS

Extended European Search Report and Written Opinion issued in European Patent Application No. 21191268.8, dated Jan. 20, 2022, in 11 pages.
John Deere 90 SERIES 7 Degree SFP Opener Greaseless Pivot Kit, 1 Row; https://shop.deere.com/us/product/AA110764%3A-90-Series-7-Degree-SFP-Opener-Greaseless-Pivot-Kit%2C-1-Row/p/AA110764; Date Jan. 10, 2025; pp. 1-4.

\* cited by examiner

Position Adjustment, Position Feedback

152

Select Desired Arm Angle

154

Determine Actual Arm Angle

156

Is Actual Arm Angle =
Desired Arm Angle?          Yes

No

158

No          Is Actual Arm Angle <
Desired Arm Angle?          Yes 162                                                    160

Move Rearward End of
Rotate Frame Downward

Move Rearward End of
Rotate Frame Upward

Downforce Adjustment, Position Feedback

166 — Select Desired Arm Angle

168 — Determine Actual Arm Angle

170 — Is Actual Arm Angle = Desired Arm Angle?    Yes

No

172 — No    Is Actual Arm Angle > Desired Arm Angle?    Yes

176 — Increase Downforce of Rotate Frame

174 — Decrease Downforce of Rotate Frame

Downforce Adjustment, Downforce Feedback

180

Select Desired Downforce of
Row Unit

182

Calculate Desired total
Downforce

184

Determine Total Actual
Downforce

186

Is Total Actual Downforce =
Desired Total Downforce?  Yes

No

188

No  Is Total Actual Downforce <
Total Desired Downforce?  Yes

192

Decrease Downforce of
Rotate Frame

190

Increase Downforce of
Rotate Frame

—193

Individual Row Hydraulic Downforce (IRHD) Control

194

Select Desired Downforce of
each Row Unit

196

Determine Actual Downforce
of each Row Unit

198

Is Actual Downforce =
Desired Downforce?    Yes

No

200

No    Is Actual Downforce <
Desired Downforce?    Yes

204

Decrease Downforce of Row
Unit

202

Increase Downforce of Row
Unit

206

Position Adjustment, Downforce Feedback

208

Select Desired Downforce of
Row Unit

210

Determine Actual Downforce
of Row Unit

212

Is Actual Downforce =
Desired Downforce?          Yes

No

214

No     Is Actual Downforce <
Desired Downforce?          Yes

218

Move Rearward End of
Rotate Frame Upward

216

Move Rearward End of
Rotate Frame Downward

220

Downforce Limit

222

Select Maximum Downforce
Limit of Row Unit

224

Determine Actual Downforce
of Row Unit

226

Is Actual Downforce >
Maximum Downforce Limit?          No

Yes

228

Move Rearward End of
Rotate Frame Upward

FRAME ADJUSTMENT CONTROL SYSTEM AND METHOD FOR DOWNFORCE

RELATED APPLICATIONS

This application claims priority to U.S. Provisional Application Ser. No. 63/066,922, filed Aug. 18, 2020, the disclosure of which is hereby incorporated by reference in its entirety.

FIELD OF THE DISCLOSURE

The present disclosure relates to an agricultural machine, such as a planter with a toolbar or rockshaft frame, and more particularly to control systems and methods for adjusting the toolbar or rockshaft frame.

BACKGROUND OF THE DISCLOSURE

Work machines, such as those in the agricultural, construction and forestry industries perform a variety of operations. In some instances, the machines are provided with a toolbar frame or a rockshaft frame that may be rotated relative to a main frame of the machine. In some instances, the work machine may be an agricultural planter or row crop planter having row units configured to distribute a commodity to the soil. The row units may be configured to follow the rockshaft frame or the toolbar frame along the ground.

Tires and track sizes of row crop planters continue to grow such that they can no longer be mounted in their prior locations on the machine. There is a tendency to move the tires or tracks forward relative to the main frame of the machine. This means that the pivot point about which the rockshaft or toolbar frame rotates must move as well. Additionally, as the terrain changes and becomes more challenging, the row units need to travel further in the vertical direction relative to the toolbar or rockshaft frame in order to stay engaged with the soil. These obstacles and other considerations create a need for more effective systems and methods for controlling adjustment of the toolbar or rockshaft frame on agricultural machines.

SUMMARY

In an illustrative embodiment of the present disclosure a method for an agricultural machine including a main frame, a rotate frame coupled to the main frame, and a row unit coupled to the rotate frame comprises: (a) selecting a desired frame-to-arm angle defined between a rearward portion of the rotate frame and an arm extending between the rearward portion of the rotate frame and the row unit; (b) determining an actual frame-to-arm angle defined between the rearward portion of the rotate frame and the arm; and (c) adjusting the actual frame-to-arm angle toward the desired frame-to-arm angle, wherein adjusting the actual frame-to-arm angle includes moving the rotate frame relative to the main frame of the agricultural machine.

In some embodiments, moving the rotate frame relative to a main frame includes: rotating the rearward end of the rotate frame upward when the actual frame-to-arm angle is greater than the desired frame-to-arm angle; and rotating the rearward end of the rotate frame downward when the actual frame-to-arm angle is less than the desired frame-to-arm angle.

In some embodiments, the method further comprises: (d) selecting a desired row unit downforce that is exerted by the row unit on the soil; (e) determining the actual row unit downforce that is exerted by the row unit on the soil; and (f) adjusting the actual row unit downforce toward the desired row unit downforce. The steps (e) and (f) collectively are completed at a faster rate than are steps (b) and (c) collectively.

In some embodiments, adjusting the actual frame-to-arm angle toward the desired frame-to-arm angle includes: sending a first signal to a first group of one or more actuators coupled to the rotate frame and the main frame; and moving the first group of one or more actuators from a first position to a second position based on the first signal, wherein in the first position the actual frame-to-arm angle is not equal to or within an acceptable range of the desired frame-to-arm angle, and in the second position the actual frame-to-arm angle is equal to or within an acceptable range of the desired frame-to-arm angle. As used herein, the term "group" includes one or more objects.

In some embodiments, adjusting the actual frame-to-arm angle toward the desired frame-to-arm angle further includes: sending a second signal to a second group of one or more actuators coupled to the rotate frame and the main frame; and moving the second group of one or more actuators from a third position to a fourth position based on the second signal; wherein in the third position the actual frame-to-arm angle is not equal to or within an acceptable range of the desired frame-to-arm angle, and in the fourth position the actual frame-to-arm angle is equal to or within an acceptable range of the desired frame-to-arm angle.

In some embodiments, adjusting the actual frame-to-arm angle toward the desired frame-to-arm angle further includes: sending a third signal to a third group of one or more actuators coupled to the rotate frame and the main frame; and moving the third group of one or more actuators from a fifth position to a sixth position based on the third signal; wherein in the fifth position the actual frame-to-arm angle is not equal to or within an acceptable range of the desired frame-to-arm angle, and in the sixth position the actual frame-to-arm angle is equal to or within an acceptable range of the desired frame-to-arm angle.

In some embodiments, moving the rotate frame relative to the main frame of the agricultural machine includes: rotating the rotate frame from a first position to a second position, wherein in the first position the actual frame-to-arm angle is not equal to or within an acceptable range of the desired frame-to-arm angle, and in the second position the actual frame-to-arm angle is equal to the desired frame-to-arm angle. The agricultural machine further includes a wing frame coupled to a lateral end of the rotate frame, and the method further comprises: adjusting the wing frame to be substantially aligned with the rotate frame in response to the rotate frame rotating to the second position.

In some embodiments, the agricultural machine further includes a wing frame coupled to a lateral end of the rotate frame and a wing row unit coupled to the wing frame, and the method further comprises: selecting a desired wing-to-arm angle defined between a rearward portion of the wing frame and a wing arm extending between the rearward portion of the wing frame and the wing row unit; determining an actual wing-to-arm angle defined between the rearward portion of the wing frame and the wing arm; and adjusting the actual wing-to-arm angle toward the desired wing-to-arm angle, wherein adjusting the actual wing-to-arm angle includes moving the wing frame relative to the main frame of the agricultural machine.

In another illustrative embodiment, a method for an agricultural machine including a main frame, a rotate frame coupled to the main frame, and a row unit coupled to the rotate frame comprises: (g) selecting a desired frame-to-arm angle defined between a rearward portion of the rotate frame and an arm extending between the rearward portion of the rotate frame and the row unit; (h) determining an actual frame-to-arm angle defined between the rearward portion of the rotate frame and the arm; and (i) adjusting a downforce exerted by the rotate frame on the row unit based on the position of the arm relative to the rotate frame.

In some embodiments, adjusting a downforce exerted by the rotate frame on the row unit includes: decreasing the rotate-frame downforce when the actual frame-to-arm angle is greater than the desired frame-to-arm angle; and increasing the rotate-frame downforce when the actual frame-to-arm angle is less than the desired frame-to-arm angle.

In some embodiments, the method further comprises: (j) selecting a desired row unit downforce that is exerted by the row unit on the soil; (k) determining the actual row unit downforce that is exerted by the row unit on the soil; and (l) adjusting the actual row unit downforce toward the desired row unit downforce. In some embodiments, steps (k) and (l) collectively are completed at a faster rate than are steps (h) and (i) collectively.

In some embodiments, adjusting a downforce exerted by the rotate frame on the row unit based on the position of the arm relative to the rotate frame includes: sending a first downforce signal to a first group of one or more commonly-sized actuators coupled to the rotate frame and the main frame; and adjusting the pressure within actuators of the first group of one or more commonly-sized actuators from a first pressure to a second pressure based on the downforce signal; wherein at the first pressure the actual frame-to-arm angle is not equal to or within an acceptable range of the desired frame-to-arm angle, and at the second pressure the actual frame-to-arm angle is equal to or within an acceptable range of the desired frame-to-arm angle.

In some embodiments, adjusting a downforce exerted by the rotate frame on the row unit based on the position of the arm relative to the rotate frame further includes: sending at least one additional downforce signal to a corresponding at least one additional group of one or more commonly-sized actuators coupled to the rotate frame and the main frame; and adjusting the pressure within actuators of the corresponding at least one additional group of one or more commonly-sized actuators from a third pressure to a fourth pressure based on the at least one additional downforce signal; wherein at the third pressure the actual frame-to-arm angle is not equal to or within an acceptable range of the desired frame-to-arm angle, and at the fourth pressure the actual frame-to-arm angle is equal to or within an acceptable range of the desired frame-to-arm angle.

In some embodiments, the method further comprises: selecting a desired row unit downforce that is exerted by the row unit; determining an actual row unit downforce that is exerted by the row unit; and adjusting a rotate frame downforce that is exerted by the rotate frame based on the actual row unit downforce.

In another illustrative embodiment, a method for an agricultural machine including a main frame, a rotate frame coupled to the main frame, and a row unit coupled to the rotate frame comprises: selecting a desired row unit downforce that is exerted by the row unit; determining an actual row unit downforce that is exerted by the row unit; adjusting a rotate frame downforce that is exerted by the rotate frame based on the actual row unit downforce.

In some embodiments, the method further comprises: selecting a maximum downforce limit of the row unit; and rotating a rearward portion of the rotate frame upward if the actual row unit downforce is greater than the maximum downforce limit of the row unit. The method further comprises: selecting a minimum downforce limit of the row unit; and moving at least the rearward portion of the rotate frame downward if the actual row unit downforce is less than the minimum downforce limit of the row unit.

In another illustrative embodiment, a method for an agricultural machine including a main frame, a rotate frame coupled to the main frame, and a row unit coupled to the rotate frame, comprises: selecting at least one of: (i) a desired position-based relationship between a portion of the rotate frame and the row unit, and (ii) a desired downforce of the row unit; determining at least one of: (i) an actual position-based relationship defined between the portion of the rotate frame and the row unit, and (ii) an actual downforce of the row unit; and adjusting at least one of: (i) the actual position-based relationship toward the desired position-based relationship, and (ii) the actual downforce of the row unit toward the desired downforce of the row unit; wherein adjusting the actual position-based relationship toward the desired position-based relationship includes moving the rotate frame relative to the main frame of the agricultural machine; and wherein adjusting the actual downforce of the row unit toward the desired downforce of the row unit includes moving the rotate frame relative to the main frame of the agricultural machine.

In another illustrative embodiment, an agricultural machine comprises: a main frame; a rotate frame coupled to the main frame; a row unit coupled to the rotate frame and configured to deliver commodity to the soil; a linkage assembly including an arm having a first end pivotably coupled to the rotate frame and a second end pivotably coupled to the row unit; a sensor configured to identify a position of the arm relative to the rotate frame; and a controller configured send a signal instructing the rotate frame to move relative to the main frame based on the position of the arm relative to the rotate frame.

In some embodiments, the agricultural machine further comprises: an actuator having a first end coupled to the main frame and a second end coupled to the rotate frame; wherein the actuator is configured to receive the signal sent by the controller and move the rotate frame relative to the main frame based on the signal sent by the controller.

In some embodiments, the agricultural machine further comprises: a first group of one or more actuators each having a first end coupled to the main frame and a second end coupled to the rotate frame; and a second group of one or more actuators each having a first end coupled to the main frame and a second end coupled to the rotate frame; wherein the controller is configured to send a first signal to each actuator of first group of one or more actuators instructing the actuators to move the rotate frame from a first position to a second position; and wherein the controller is configured to send a second signal to each actuator of the second group of one or more actuators instructing the actuators move the rotate frame from the first position to the second position.

In some embodiments, the agricultural machine further comprises: a third group of one or more actuators each having a first end coupled to the main frame and a second end coupled to the rotate frame; wherein the controller is configured to send a third signal to each actuator of the third group of one or more actuators to instructing the actuators to move the rotate frame from the first position to the second position.

In some embodiments, the first group of one or more actuators are commonly-sized actuators, the second group of one or more actuators are commonly-sized actuators having a different size than the first group of one or more actuators, and the third group of one or more actuators are commonly-sized actuators having a different size than the first and second groups of one or more actuators.

In some embodiments, the agricultural machine further comprises: a wing frame coupled to a lateral end of the rotate frame; a wing row unit coupled to the wing frame and configured to deliver commodity to the soil; and a wing linkage assembly including a wing arm having a first end pivotably coupled to the wing frame and a second end pivotably coupled to the wing row unit; wherein the controller is configured to send a signal instructing the wing frame to move relative to the main frame based on the position of the wing arm relative to the wing frame.

In some embodiments, the agricultural machine further comprises: a wing frame coupled to a lateral end of the rotate frame; a wing row unit coupled to the wing frame and configured to deliver commodity to the soil; and a wing linkage assembly including a wing arm having a first end pivotably coupled to the wing frame and a second end pivotably coupled to the wing row unit; wherein the controller is configured to send a signal instructing the wing frame to move relative to the main frame based on the position of the rotate frame.

In another illustrative embodiment, the agricultural machine comprises: a main frame; a rotate frame coupled to the main frame; a row unit coupled to the rotate frame and configured to deliver commodity to the soil; a linkage assembly including an arm having a first end pivotably coupled to the rotate frame and a second end pivotably coupled to the row unit; a sensor configured to identify a position of the arm; a controller configured to send a signal causing an adjustment of the downforce exerted by the rotate frame on the row unit based on the position of the arm.

In some embodiments, the agricultural machine further comprises: an actuator having a first end coupled to the main frame and a second end coupled to the rotate frame; wherein the actuator is configured to receive the signal sent by the controller and to increase or decrease its internal pressure based on the signal sent by the controller. The row unit includes a downforce gauge configured to determine the downforce exerted by the row unit; and the controller is configured to send a signal to the actuator instructing the actuator to adjust the pressure therein based on the downforce exerted by the row unit.

In some embodiments, the agricultural machine further comprises: a first group of one or more actuators each having a first end coupled to the main frame and a second end coupled to the rotate frame; and a second group of one or more actuators each having a first end coupled to the main frame and a second end coupled to the rotate frame; wherein the controller is configured to send a first signal to each actuator of the first group of one or more actuators to adjust the pressure within each actuator of the first group of one or more actuators from a first pressure to a second pressure to cause movement of the rotate frame from a first position to a second position; and wherein the controller is configured to send a second signal to each actuator of the second group of one or more actuators to adjust the pressure within each actuator of the second group of one or more actuators from a third pressure to a fourth pressure to cause movement of the rotate frame from the first position to the second position.

In some embodiments, the agricultural machine further comprises: a third group of one or more actuators each having a first end coupled to the main frame and a second end coupled to the rotate frame; wherein the controller is configured to send a third signal to each actuator of the third group of one or more actuators to adjust the pressure within each actuator of the third group of one or more actuators from a fifth pressure to a sixth pressure to cause movement of the rotate frame from the first position to the second position.

In another illustrative embodiment, the agricultural machine comprises: a main frame; a rotate frame coupled to the main frame; a row unit coupled to the rotate frame and configured to deliver commodity to the soil, the row unit including a downforce gauge configured to measure the downforce exerted by the row unit; an actuator having a first end coupled to the main frame and a second end coupled to the rotate frame; and a controller configured to send a signal to the actuator instructing the actuator to adjust a pressure within the actuator based on the downforce exerted by the row unit.

In another illustrative embodiment, the agricultural machine comprises: a main frame; a rotate frame coupled to the main frame; a row unit coupled to the rotate fame and configured to deliver commodity to the soil, the row unit including a downforce gauge configured to measure the downforce exerted by the row unit; an actuator having a first end coupled to the main frame and a second end coupled to the rotate frame; and a controller configured to send a signal to the actuator instructing the actuator adjust the position of the rotate frame based on the downforce exerted by the row unit.

In another illustrative embodiment, a method for an agricultural machine including a main frame, a rotate frame coupled to the main frame, and a row unit coupled to the rotate frame, comprises selecting at least one of (i) a desired position-based relationship between a portion of the rotate frame and the row unit and (ii) a desired downforce of the row unit. The method further comprises determining at least one of (i) an actual position-based relationship defined between the portion of the rotate frame and the row unit and (ii) an actual downforce of the row unit. The method further comprises adjusting at least one of (i) the actual position-based relationship toward the desired position-based relationship and (ii) the actual downforce of the row unit toward the desired downforce of the row unit. In the illustrative embodiment, adjusting the actual position-based relationship toward the desired position-based relationship includes moving the rotate frame relative to the main frame of the agricultural machine. In the illustrative embodiment, adjusting the actual downforce of the row unit toward the desired downforce of the row unit includes moving the rotate frame relative to the main frame of the agricultural machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
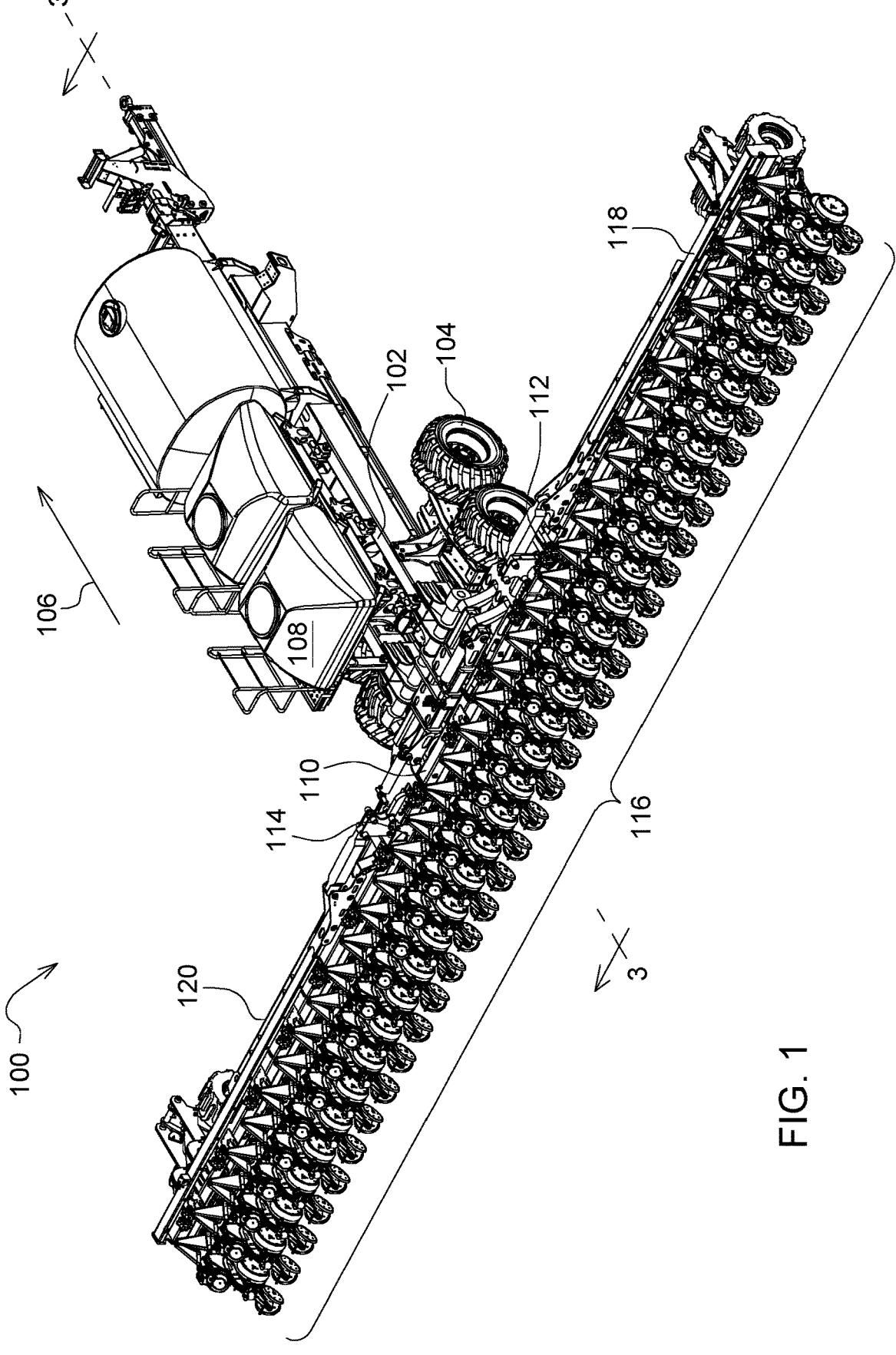
FIG. 1 is a perspective view of an agricultural machine showing a main frame, a rotate frame, and row units of the agricultural machine.
Figure 11:
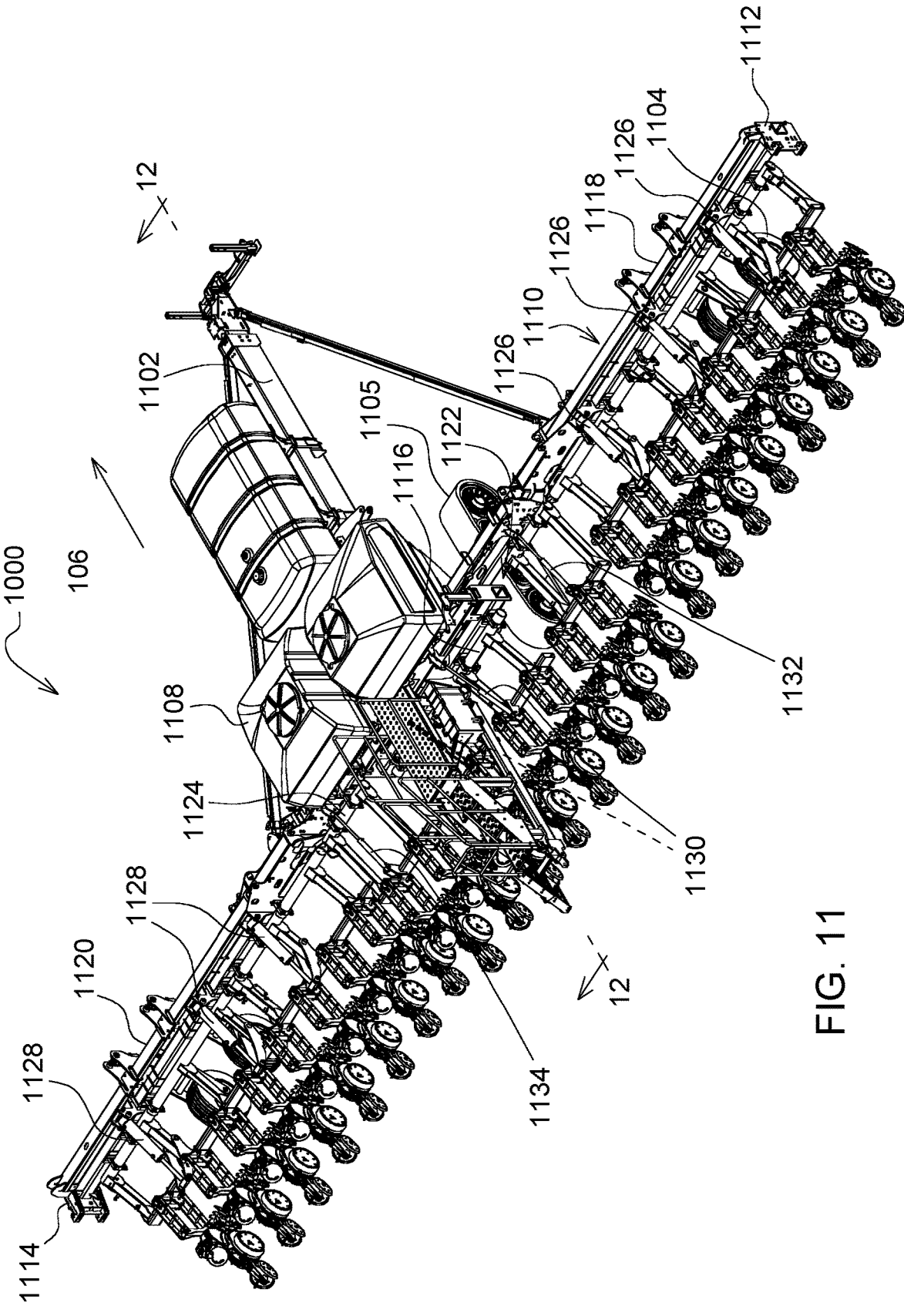
FIG. 11 is a perspective view another agricultural machine showing a main frame, a rotate frame, and row units of the agricultural machine.
Figure 12:
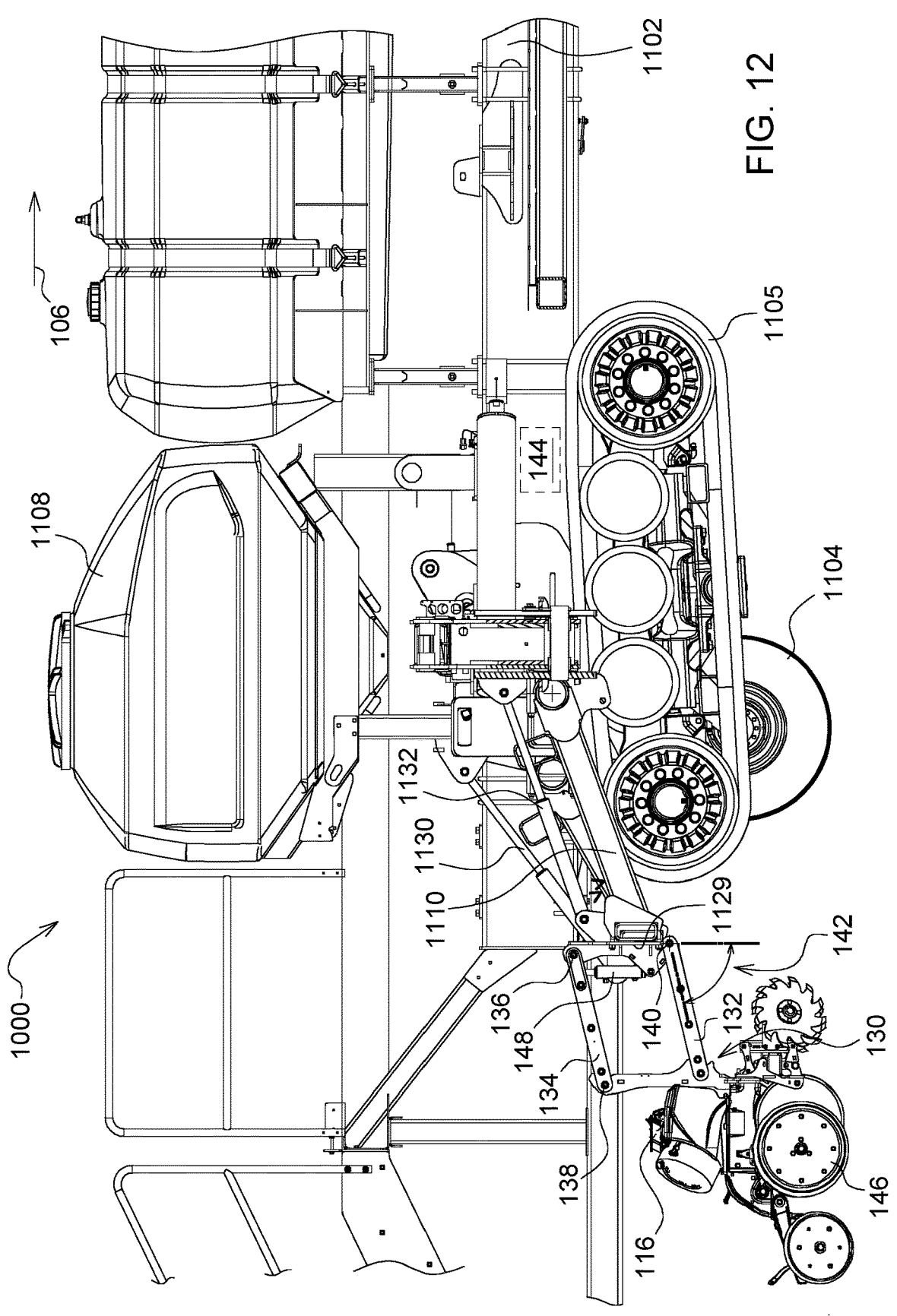
FIG. 12 is a cross-section view of a portion of the agricultural machine of FIG. 11 showing a position-based relationship between the rotate frame and a row unit.

Referring to FIG. 1, an exemplary embodiment of an agricultural machine, such as a row crop planter 100 is shown. The machine 100 includes a main frame 102 supported above the ground by wheels 104. It should be appreciated that in some cases (e.g., FIG. 11) a main frame may also be supported by tracks or another mechanism capable of moving the machine forwardly in the axial direction as indicated by the arrow 106. The main frame 102 may support one or more commodity containers such as the container 108. The main frame 102 is coupled to a rotate frame 110 that extends laterally from a first lateral end 112 to a second lateral end 114. It should be appreciated that the rotate frame 110 illustratively shown in FIG. 1 may be referred to as a toolbar; however, the aspects of the disclosure may be applicable to other rotate frame configurations as well (e.g., a rockshaft-type rotate frame as shown in FIG. 11).

A plurality of row units 116 are coupled to a rearward end of rotate frame 110 to deliver commodity received from the commodity container 108 to the soil. As described in greater detailed below, the rotate frame 110 may be adjusted relative to the main frame 102 to maintain each row unit 116 at an optimal position and/or downforce. The machine 100 also includes a first wing frame 118 coupled to the first lateral end 112 of the rotate frame 110 and a second wing frame 120 coupled to the second lateral end 114 of the rotate frame 110. It should be appreciated that the wing frame 118 is a mirror image of, but otherwise identical to, the wing frame 120 such that any description of the wing frame 118 and its related components applies equally to the wing frame 120.

The rotate frame 110 and the wing frames 118, 120 may be adjusted to maintain each row unit 116 at an optimal position and/or downforce. The row units 116 are designed to have a desired amount of travel in an acceptable working range. If the rear end of the rotate frame 110 rotates upward or downward an excessive amount relative to the mainframe 102, the row units 116 may become positioned outside the acceptable working range. This excessive rotation may occur in response to the agricultural machine 100 traversing ground having uneven surfaces.

Figure 4:
FIG. 4 is a flow diagram of a control method for the agricultural machine using position adjustment of the rotate frame based on position feedback from the row units.
Figure 5:
FIG. 5 is a flow diagram of a control method for the agricultural machine using downforce adjustment of the rotate frame based on position feedback from the row units.
Figure 6:
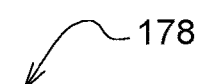
FIG. 6 is a flow diagram of a control method for the agricultural machine using downforce adjustment of the rotate frame based on downforce feedback from the row units.
Figure 8:
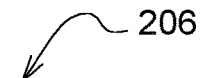
FIG. 8 is a flow diagram of a control method for the agricultural machine using position adjustment of the rotate frame based on downforce feedback from the row units.

Several control methods used to adjust the rotate frame 110 are described in detail herein. Specifically, (i) the position of the rotate frame may be adjusted based on position feedback from the row units, as shown in FIG. 4; (ii) the downforce of the rotate frame may be adjusted based on position feedback from the row units, as shown in FIG. 5; (iii) the downforce of the rotate frame may be adjusted based on downforce feedback from the row units, as shown in FIG. 6; and (iv) the position of the rotate frame may be adjusted based on downforce feedback from the row units, as shown in FIG. 8.

Figure 2:
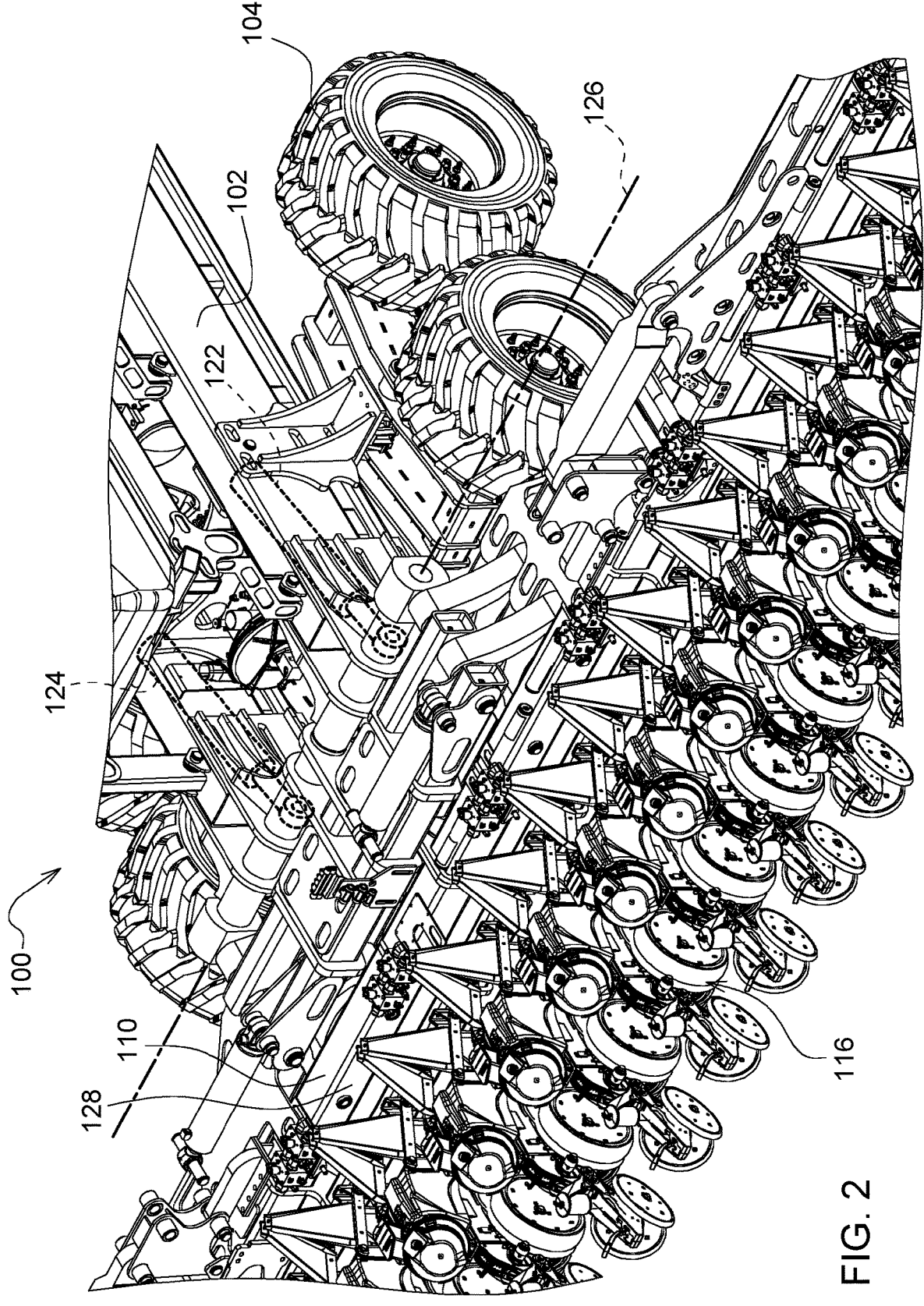
FIG. 2 is a perspective view of a portion of the agricultural machine of FIG. 1 showing, in phantom, actuators coupled between the main frame and the rotate frame.

Referring now to FIG. 2, the work machine includes a first actuator 122 and a second actuator 124 each coupled between the main frame 102 and the rotate frame 110. The actuators 122, 124 are moveable between an extended position (or pressurized condition) and a retracted position (or depressurized condition) to adjust the downforce and/or the position of rotate frame 110. For example, when the actuators 122, 124 are extended (or pressurized), the rotate frame 110 pivots about the axis 126 to move a rearward portion 128 of the rotate frame 110 upward. When the actuators 122, 124 are contracted (or depressurized), the rotate frame 110 pivots about the axis 126 to move the rearward portion 128 of the rotate frame 110 downward (see FIG. 3). By adjusting the downforce and/or the position of the rotate frame 110, the position and the downforce of the row units 116 are also adjusted.

It should be appreciated that if the position of the rotate frame 110 is adjusted, the actuators must move from a first position to a second position. Therefore, position sensors and positioning software of the machine 100 may be used to determine and adjust the position of the actuators and/or the rotate frame 110. However, if the downforce of the rotate frame 110 is adjusted, the pressure within the actuators is increased or decreased without the use of positioning components. Therefore, because downforce adjustment is not reliant on position sensors and positioning software, the downforce adjustment control methods discussed below may operate at a faster rate than the position adjustment control methods discussed below.

Figure 3:
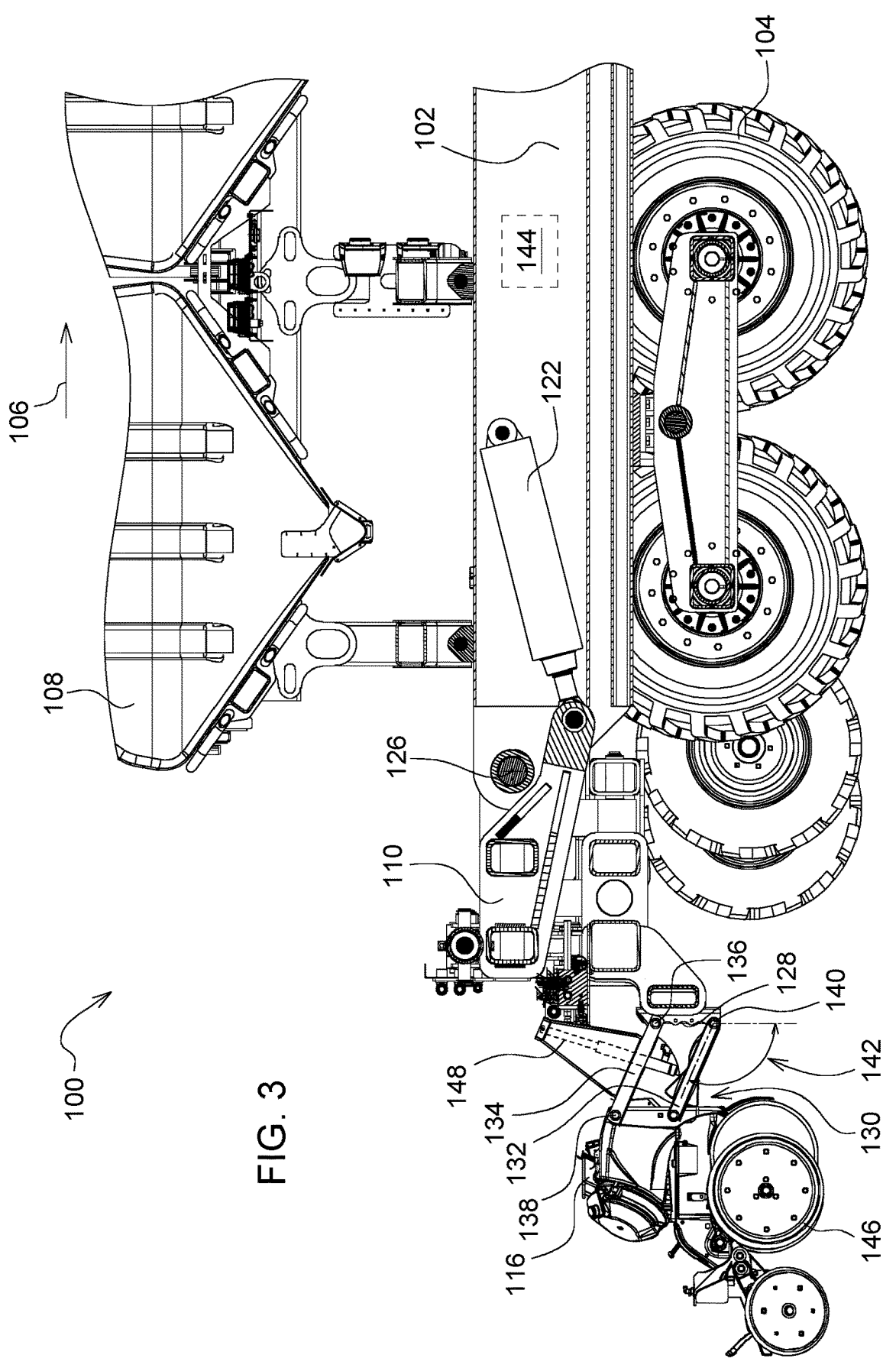
FIG. 3 is a cross-section view of a portion of the agricultural machine of FIG. 1 showing a position-based relationship between the rotate frame and a row unit.

As shown in FIG. 3, each row unit 116 is coupled to the rotate frame 110 via a linkage assembly 130. The linkage assembly 130 includes a pair of parallel arms including a first arm 132 and a second arm 134. It should be appreciated that the arms 132, 134 are identical such that any description of one arm applies equally to the other arm. The arm 134 includes a first end 136 coupled to the rearward portion 128 of the rotate frame 110 and a second end 138 coupled to the row unit 116.

Each row unit 116 further includes a row unit actuator 148 that is configured to extend and contract to adjust the position and/or the downforce exerted by the row unit 116 on the soil. Each row unit 116 further includes a downforce gauge 146 configured to determine the downforce applied by the row unit 116 to the soil. The row unit actuator 148 and the row unit downforce gauge 146 are components of an Individual Row Hydraulic Downforce (IRHD) system which will be described in greater detail below.

The machine 100 further includes a sensor 140 configured to determine the position of the arm(s) 132 and/or 134. In the illustrative embodiments, the position of the arm(s) may be determined relative to the rotate frame 110; alternatively, the position of the rotate frame 110 and/or the arms 132, 134 may be determined relative to the ground. Any frame of reference is suitable so long as the position of a row unit 116 is determinable relative to the position of the rotate frame. The position of the row unit 116 relative to the position of the rotate frame 110 (and/or the ground) may be referred to as "a position-based relationship" between the row unit 116 and the rotate frame 110. Alternatively, this may be referred to as an "actual row-unit position value."

The sensor 140 may be any sensor suitable for determining the position of the arms 132, 134 or suitable for determining the position-based relationship or the actual row-unit position value. Examples of such sensors may include an Ultrasonic sensor or the like suitable for measuring the distance to ground from the row unit 116 and/or from the rotate frame 110, a sensor configured to measure the position of the row unit actuator 148, a sensor configured to measure the position of a gauge wheel coupled to the row unit 116 or the rotate frame 110, or a potentiometer or proximity sensor suitable for measuring the relative position of any two of: the arms 134, 136, the rotate frame 110, and the row unit 116.

The work machine 100 further includes a controller 144. The controller 144 may be a single controller or multiple controllers cooperating to form a control system. The controller 144 may be positioned on the work machine, or the controller 144 may be positioned away from the work machine and configured to operate remotely by means known in the art. The sensor 140, the actuators 122, 124, downforce gauge 146, and the row unit actuator 148 are each operatively connected to the controller 144. The controller 144 is configured to send and/or receive signals to and from the sensor 140, the actuators 122, 124, the row unit downforce gauge 136, and the row unit actuator 148. The controller 144 is also configured to receive input signals from an operator control system (not shown), as will be described in greater detail below.

Referring still to FIG. 3, in the illustrative embodiment, a frame-to-arm angle 142 is defined between the rearward portion 128 (or rearward-facing portion 128) of the rotate frame 110 and the arm 132. The frame-to-arm angle 142 is a non-limiting example of a position-based relationship between the row unit 116 and a portion of the rotate frame 110. The frame-to-arm angle 142 may be adjusted by adjusting the rotate frame 110 relative to the main frame 102 using the actuators 122, 124 described above. Additionally, the ground level or soil condition beneath the main frame 102 may vary from the ground level or soil condition beneath the row units 116 during operation of the machine 100; therefore, control methods are needed to adjust the position and/or downforce of the rotate frame 110 and to, in turn, adjust the position and/or downforce of the row units 116.

FIG. 4 illustrates a control method 150 used to adjust the rotate frame 110, wherein the position of the rotate frame 110 is adjusted based on the position of the row units 116. According to the method 150, at step 152, a desired frame-to-arm angle is selected. A user may input a desired frame-to-arm angle into the operator control system, or the desired frame-to-arm angle may be predetermined (and pre-set)

based on the type of machine and application in use. At step 154, the actual frame-arm-angle 142 is determined by the sensor 140 described above. In the illustrative embodiment, the sensor 140 sends a position signal to the controller 144. In the illustrative embodiment, the position signal is indicative of (or may be used to calculate) the actual frame-to-arm angle 142. At step 156, the controller 144 determines whether the actual frame-to-arm angle 142 is equal to the desired frame-to-arm angle. If the actual frame-to-arm angle 142 is equal to or within an acceptable range of the desired frame-to-arm angle, then the controller will repeat steps 154 and 156.

Referring again to step 156, if the actual frame-to-arm angle 142 is outside the acceptable range, the control method proceeds to step 158. At steps 158 and 160, if the actual frame-to-arm angle 142 is greater than the desired frame-to-arm angle, then the controller 144 sends a signal to the actuators 122, 124 instructing the actuators to extend from a first position to a second position. Extension of the actuators 122, 124 moves the rearward end 128 of the rotate frame 110 upward. This, in turn, decreases the actual frame-to-arm angle 142. After the actuators 122, 124 have extended to the second position, the frame-to-arm angle 142 is equal to or within an acceptable range of the desired frame-to-arm angle. Referring to steps 158 and 162, if the actual frame-to-arm angle 142 is less than the desired frame-to-arm angle, then the controller 144 sends a signal to the actuators 122, 124 instructing the actuators 122, 124 to contract from a first position to a second position. Contraction of the actuators 122, 124 moves the rearward end 128 of the rotate frame 110 downward. This, in turn, increases the actual frame-to-arm angle 142. After the actuators 122, 124 have contracted to the second position, the frame-to-arm angle 142 is equal to or within an acceptable range of the desired frame-to-arm angle.

FIG. 5 illustrates a control method 164 used to adjust the rotate frame 110, wherein the downforce of the rotate frame 110 is adjusted based on the position of the row units 116. According to the method 164, at step 166, a desired frame-to-arm angle is selected. The user may input the desired frame-to-arm angle into the operator control system, or the desired frame-to-arm angle may be predetermined (and pre-set) based on the type of machine and application being used. At step 168, the actual frame-arm-angle 142 is determined by the sensor 140 described above. In the illustrative embodiment, the sensor 140 sends a position signal to the controller 144. In the illustrative embodiment, the signal is indicative of (or may be used to calculate) the actual frame-to-arm angle 142. At step 170, the controller 144 determines whether the actual frame-to-arm angle 142 is equal to the desired frame-to-arm angle. If the actual frame-to-arm angle 142 is equal to or within an acceptable range of the desired frame-to-arm angle, then the controller will repeat steps 168 and 170.

Referring again to step 170, if the actual frame-to-arm angle 142 is outside the acceptable range the control method proceeds to step 172. At steps 172 and 174, if the actual frame-to-arm angle 142 is greater than the desired frame-to-arm angle, then the controller 144 will send a signal to the actuators 122, 124 instructing the actuators to decrease the downforce of the rotate frame 110. The downforce of the rotate frame 110 is the downforce that the rotate frame 110 applies to the arms 132, 134 of the row unit 116. In other words, the controller sends a signal to the actuators 122, 124 instructing the actuators to increase pressure therein, and thus extend, to decrease the downforce of the rotate frame 110. Increasing the pressure within the actuators 122, 124 moves the rearward end 128 of the rotate frame 110 upward. This, in turn, decreases the actual frame-to-arm angle 142. After the actuators 122, 124 have experienced this increase in pressure, the frame-to-arm angle 142 is equal to or within an acceptable range of the desired frame-to-arm angle.

Referring to steps 172 and 176, if the actual frame-to-arm angle 142 is less than the desired frame-to-arm angle, then the controller 144 will send a signal to the actuators 122, 124 instructing the actuators to increase the downforce of the rotate frame 110. In other words, the controller sends a signal to the actuators 122, 124 instructing the actuators to decrease pressure therein, and thus contract, to increase the downforce of the rotate frame 110. Decreasing the pressure within the actuators 122, 124 moves the rearward end 128 of the rotate frame 110 downward. This, in turn, increases the actual frame-to-arm angle 142. After the actuators 122, 124 have experienced this decrease in pressure, the frame-to-arm angle 142 is equal to or within an acceptable range of the desired frame-to-arm angle.

It should be appreciated that, in some embodiments, the control methods 150 and 164 may operate based on an average actual frame-to-arm angle. Therefore, the actual frame-to-arm angle 142 would be determined for each row unit 116, and an average actual frame-to-arm angle would be calculated therefrom. In this case, the average actual frame-to-arm angle would be substituted for the actual frame-to-arm angle 142 in the control methods 150 and 164.

In some instances, the position of row units 116 (and therefore the actual-frame-arm angle 142) can change very quickly over a small distance and/or over a short time. Thus, a filter may be applied to the position signal sent by the sensor 140. For example, a filter may be applied whereby the controller 144 calculates the average position of the arm(s) 132, 134 over a linear foot, for example, of ground profile. A filtered signal indicative of the average position is then received by the controller 144, at which point, the control method 150 or 164 resumes normal operation with step 156 or 170 as described above. The filter may be applied to the average position of the arm(s) of each row unit 116 or to the position of the arm(s) of a single row unit 116. It should be appreciated that the average position calculation and the filter described above may be applied to the frame-to-arm angle 142 or any other position-based relationship of the row units 116 relative to the rotate frame 110.

Thus, it should be appreciated that while the frame-to-arm angle 142 is shown and described in the exemplary embodiments, other angles or reference points between different components may be used to provide a position-based relationship between the row unit 116 relative and the rotate frame 110.

FIG. 6 illustrates a control method 178 used to adjust the rotate frame 110, wherein the downforce of the rotate frame 110 is adjusted based on the downforce of the row units 116. According to the method 178, at step 180, a desired downforce for each row unit 116 is selected. A user may input the desired downforce into the operator control system, or the desired downforce may be predetermined (and pre-set) based on the type of machine and application in use. Alternatively still, the machine 100 may include a "learn mode" to provide downforce outputs to the operator based on the position of the arms 132, 134, and the operator may select a desired downforce based on the downforce outputs provided at each arm position.

Referring still to FIG. 6, at step 182, the controller 144 calculates the total desired downforce of all the row units 116 based on the desired downforce of each individual row unit 116. In other words, the individual row unit desired downforce values are summed to calculate a desired total row unit downforce.

Each row unit 116 includes a downforce gauge 146 operatively connected to the controller 144, as described above. Each downforce gauge 146 sends an actual row unit downforce signal to the controller 144. The controller 144 sums the actual row unit downforce values to calculate a total actual row unit downforce. At step 186, the controller 144 determines whether the total actual row unit downforce is equal to or within an acceptable range of the desired total row unit downforce. If the total actual row unit downforce is equal to or within an acceptable range of the desired total row unit downforce, then the controller will repeat steps 184 and 186.

Referring again to step 186, if the total actual row unit downforce is outside the acceptable range the control method proceeds to step 188. At steps 188 and 190, if the actual total row unit downforce is less than the total desired row unit downforce, then the controller 144 will send a signal to the actuators 122, 124 instructing the actuators to increase the downforce of the rotate frame 110. In other words, the controller 144 sends a signal to the actuators 122, 124 instructing the actuators 122, 124 to decrease pressure therein, and thus contract, to increase the downforce of the rotate frame 110. Decreasing the pressure within the actuators 122, 124 moves the rearward end 128 of the rotate frame 160 downward. This, in turn, increases the total actual row unit downforce. After the actuators 122, 124 have experienced this decrease in pressure, the total actual row unit downforce 142 is equal to or within an acceptable range of the desired total row unit downforce.

Referring now to steps 188 and 192, if the actual total row unit downforce is greater than the total desired row unit downforce, then the controller 144 sends a signal to the actuators 122, 124 instructing the actuators to decrease the downforce of the rotate frame 110. In other words, the controller 144 sends a signal to the actuators 122, 124 instructing the actuators to increase pressure therein, and thus extend, to increase the downforce of the rotate frame 110. Increasing the pressure within the actuators 122, 124 moves the rearward end 128 of the rotate frame 110 downward. This, in turn, increases the total actual row unit downforce. After the actuators 122, 124 have experienced this increase in pressure, the total actual row unit downforce is equal to or within an acceptable range of the desired total row unit downforce.

The control method 178 may be used as a stand-alone control method for the machine 100. Additionally, the control method 178 may be used to supplement the control method 164 described in FIG. 5. In other words, in some embodiments, the downforce feedback from the row units 116 may be used to supplement the position feedback from the row units 116.

As described above, each row unit 116 includes a row unit actuator 148 and a row unit downforce gauge 146, which are components of the Individual Row Hydraulic Downforce (IRHD) system. In various known agricultural machines, similar IRHD systems may adjust the position or downforce of row units without regard to the newly contemplated control methods described herein. The IRHD system described herein may be used in conjunction with the newly contemplated control methods described herein. However, if the IRHD system is combined with one or more of the newly contemplated control methods described herein, the IRHD system may have a tendency to respond rhythmically with the newly contemplated control methods such that their respective effects (downforce or position adjustment of the row units) cancel each other out. Thus, the newly contemplated control systems are designed to operate at a slower rate than the IRHD system to overcome the offsetting-effect. The slower rate of operation described above is applicable to at least the control methods 150, 164, and 178. Such concepts will be discussed in greater detail below with the description of the IRHD system.

Figure 7:
FIG. 7 is a flow diagram of an Individual Row Hydraulic Downforce control method for the agricultural machine.

In the illustrative embodiment shown in FIG. 7, the IRHD system herein operates according to method 193. According to the method 193, at step 194, a desired downforce for each row unit 116 is selected. A user may input the desired downforce into the operator control system, or the desired downforce may be predetermined (and pre-set) based on the type of machine and application in use. Alternatively still, the machine 100 may include a "learn mode" to provide downforce outputs to the operator based on the position of the arms 132, 134, and the operator may select a desired downforce based on the downforce outputs provided at each arm position.

Referring still to FIG. 7, at step 196, the actual downforce of a row unit 116 is determined by the row unit downforce gauge 146. The downforce gauge 146 sends a signal indicating the actual row unit downforce to the controller 144. At step 198, the controller 144 determines whether the actual row unit downforce is equal to or within an acceptable range of the desired row unit downforce. If the actual row unit downforce is equal to or within an acceptable range of the desired row unit downforce, then the controller 144 will repeat steps 196 and 198.

Referring still to step 198, if the actual row unit downforce is not equal to or within an acceptable range of the desired row unit downforce, then the control method advances to step 200. Referring now to steps 200 and 202, if the actual row unit downforce is less than the desired row unit downforce, then the controller 144 will send a signal to the row unit actuator 148 instructing the row unit actuator 148 to extend. Extension of the row unit actuator 148 increases the downforce applied by the row unit 116 to the ground. Referring now to steps 200 and 204, if the actual row unit downforce is greater than the desired row unit downforce, then the controller 144 will send a signal to the row unit actuator 148 instructing the actuator to contract. Contraction of the row unit actuator 148 decreases the downforce applied by the row unit 116 to the soil.

In the embodiments described herein, steps 196-204 of the IRHD control method 193 are completed at a faster rate than are steps 154-162 of control method 150. Likewise, in the embodiments described herein, steps 196-204 of the IRHD control method 193 are completed at a faster rate than are steps 168-176 of control method 164. Likewise, in the embodiments described herein, steps 196-204 of the IRHD control method 193 are completed at a faster rate than are steps 182-192 of control method 178. As described above, the differences in rate of operation obviates the counteracting tendencies of the IRHD control method 193 and newly contemplated control methods 150, 164, 178.

At times, it may be beneficial to adjust the downforce of the rotate frame 110 rather than the position of the rotate frame 110, because downforce adjustment may allow for faster response time than position adjustment. Adjustment of pressure control valves of the actuators 122, 124 allows for immediate downforce adjustments without experiencing the delays associated with sensors and software that may be required for position adjustment.

In some instances, it may be beneficial to adjust the position of the rotate frame 110 based on downforce feed-back from the row units 116. FIG. 8 illustrates a control method 206 used to adjust the rotate frame 110, wherein the position of the rotate frame 110 is adjusted based on the downforce of the row units 116. According to the method 206, at step 208, user may select a desired downforce of a row unit 116. The user may input the desired downforce into the operator control system, or the desired downforce may be predetermined (and pre-set) based on the type of machine and application in use. Alternatively still, the machine 100 may include a "learn mode" to provide downforce outputs to the operator based on various positions of the arms 132, 134, and the operator may select a desired downforce based on the downforce outputs provided at each arm position.

At step 210, the actual downforce of a row unit 116 is determined by the row unit downforce gauge 146. The downforce gauge 146 sends a signal indicating the actual row unit downforce to the controller 144. At step 212, the controller 144 determines whether the actual row unit downforce is equal to or within an acceptable range of the desired row unit downforce. If the actual row unit downforce is equal to or within an acceptable range of the desired row unit downforce, then the controller 144 will repeat steps 210 and 212.

Referring still to step 212, if the actual row unit downforce is not equal to or within an acceptable range of the desired row unit downforce, then the control method 206 advances to step 214. Referring now to steps 214 and 216, if the actual row unit downforce is less than the desired row unit downforce, then the controller 144 sends a signal to the actuators 122, 124 instructing the actuators to contract from a first position to a second position. Contraction of the actuators 122, 124 moves the rearward end 128 of the rotate frame 160 downward. This, in turn, increases the actual row unit downforce. After the actuators 122, 124 have contracted to the second position, the actual row unit downforce is equal to or within an acceptable range of the desired row unit downforce. Referring now to steps 214 and 218 if the actual row unit downforce is greater than the desired frame-to-arm angle, then the controller 144 sends a signal to the actuators 122, 124 instructing the actuators to extend from a first position to a second position. Extension of the actuators 122, 124 moves the rearward end 128 of the rotate frame 110 upward. This, in turn, decreases the actual row unit downforce. After the actuators 122, 124 have extended to the second position, the actual row unit downforce is equal to or within an acceptable range of the desired row unit downforce.

Figure 9:
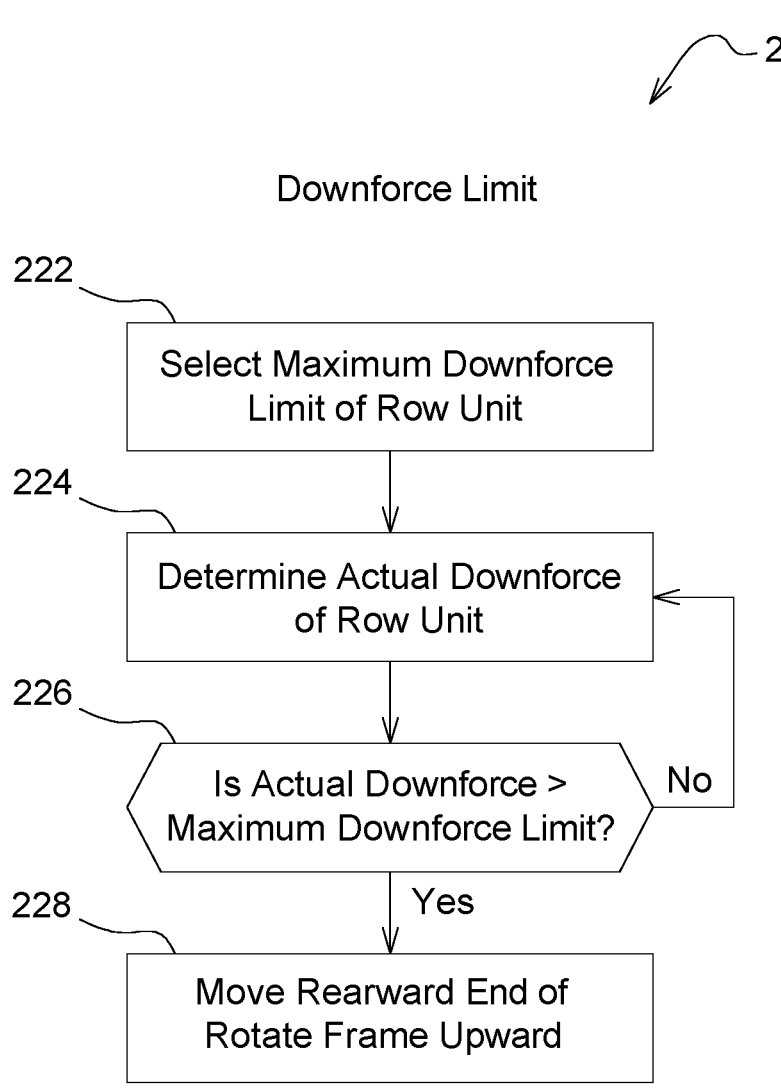
FIG. 9 is a flow diagram of a control method for the agricultural machine using position adjustment of the rotate frame based on a downforce limit of the row units.

In some instances, it may be desirable to set a maximum or minimum downforce limit for the row units 116. FIG. 9 illustrates a method 220 used to control rotation of the rotate frame 110, wherein the position of the rotate frame 110 is adjusted based on the maximum downforce limit of the row unit 116. At step 222, a maximum downforce limit of a row unit 116 is selected. The operator may input the maximum downforce limit into the operator control system, or the maximum downforce limit may be predetermined (and pre-set) based on the type of machine and application in use. At step 224, the downforce gauge 146 determines the actual downforce applied by the row unit 116 to the soil. The downforce gauge 146 sends a signal to the controller 144 indicative of the actual downforce of the row unit 116. At step 226, the controller 144 determines whether the actual downforce of the row unit 116 is greater than the maximum downforce limit of the row unit 116. If the actual downforce of the row unit 116 is greater than the maximum downforce limit of the row unit 116, then the controller 144 sends a signal to the actuators 122, 124 instructing the actuators to extend from a first position to a second position. Extension of the actuators 122, 124 moves the rearward end 128 of the rotate frame 110 upward. This, in turn, decreases the actual row unit downforce. After the actuators 122, 124 have extended to the second position, the actual downforce of the row unit 116 is no longer greater than the maximum downforce limit of the row unit 116.

Although not shown with a flow diagram, it should be appreciated that a minimum downforce limit may also be selected. In this case, a method may be used to control rotation of the rotate frame 110, wherein the position of the rotate frame 110 is adjusted based on the minimum downforce limit of the row unit 116. In this case, a minimum downforce limit of a row unit 116 is selected. The operator may input the minimum downforce limit into the operator control system, or the minimum downforce limit may be predetermined (and pre-set) based on the type of machine and application in use. The downforce gauge 146 determines the actual downforce applied by the row unit 116 to the soil. The downforce gauge 146 sends a signal to the controller 144 indicative of the actual downforce of the row unit 116. The controller 144 determines whether the actual downforce of the row unit 116 is less than the minimum downforce limit of the row unit 116. If the actual downforce of the row unit 116 is less than the minimum downforce limit of the row unit 116, then the controller 144 sends a signal to the actuators 122, 124 instructing the actuators to contract from a first position to a second position. Contraction of the actuators 122, 124 moves the rearward end 128 of the rotate frame 110 downward. This, in turn, increases the actual row unit downforce. After the actuators 122, 124 have contracted to the second position, the actual downforce of row unit 116 is no longer less than the minimum downforce limit of row unit 116.

Figure 10:
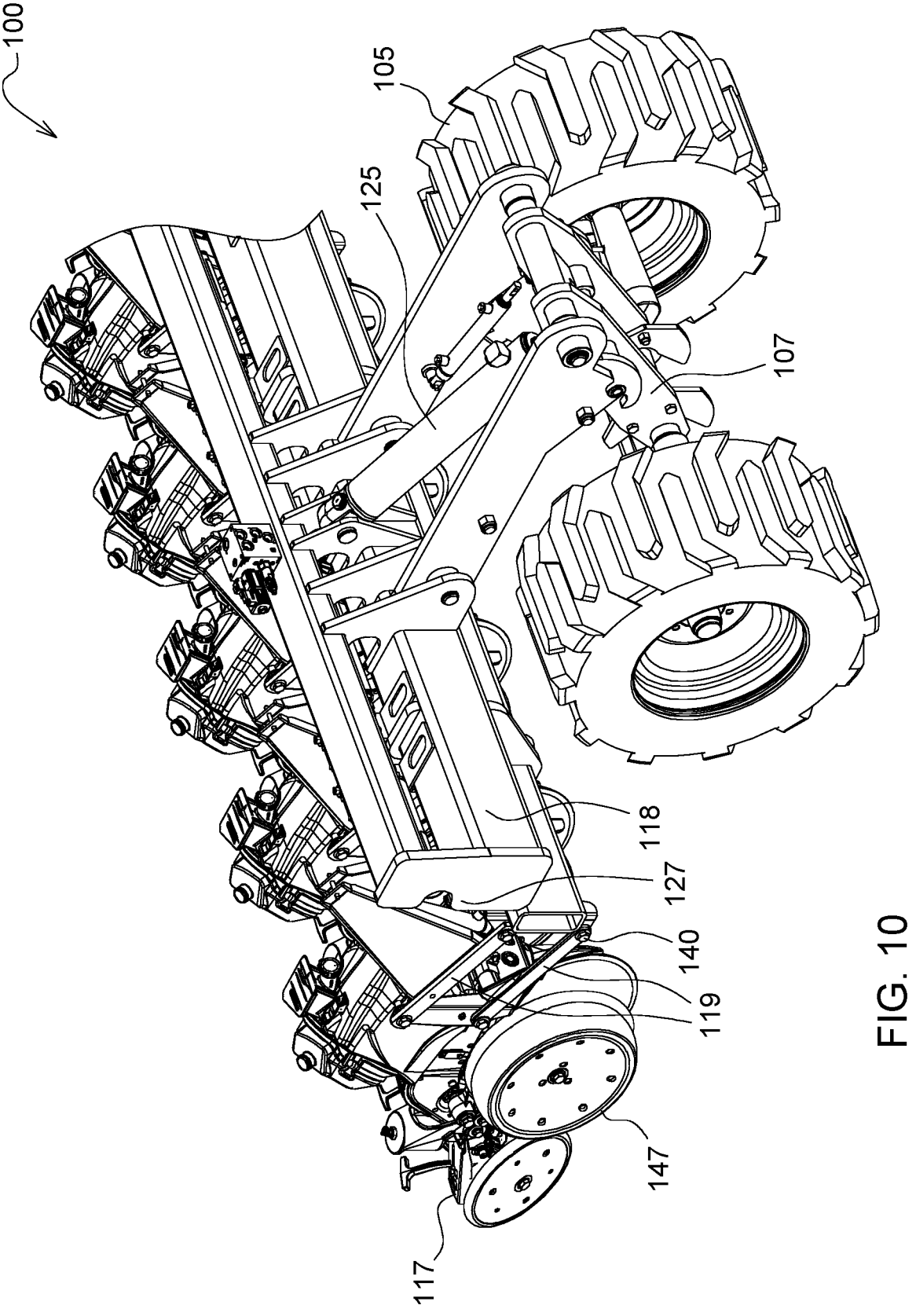
FIG. 10 is a perspective view of a wing frame of the agricultural machine of FIG. 1.

Referring now to FIG. 10, as described above, the wing frames 118, 120 are each coupled to lateral ends of the rotate frame 100. The wing frame 118 is coupled to wing row units 117 via wing arms 119. Each wing row unit 117 includes a wing downforce gauge 147 operatively connected to the controller 144. It should be appreciated that, unless stated otherwise, the wing row units 117, the wing arms 119, and the wing downforce gauges 147, are substantially the same as the row units 116, the arms 132, 134, and the downforce gauges 146—the difference being that the wing components are coupled to the wing frames 118, 120 rather than the rotate frame 110. The wing frames 118, 120 may be adjusted to maintain each wing row unit 117 at an optimal position and/or downforce. In some embodiments, the wing frame 118 may be adjusted in response to the rotate frame 110 being adjusted. The downforce or the position adjustment of the rotate frame 110 triggers an equivalent downforce or position adjustment of the wing frame 118. In that case, the adjustment of the wing frame 118 aligns the wing frame 118 with the rotate frame 110 in terms of position relative to the main frame 102. In some embodiments, the wing frame 118 is adjusted based feedback received from the wing downforce gauges 147 or based on a force sensor coupled to a base portion 107, as described below.

Referring still to FIG. 10, the work machine 100 includes a wing actuator 125 coupled at a first end to the wing frame 118 and at a second end to a base portion 107. The base portion 107 is supported by wing wheels 105. The force sensor for the base portion is configured to measure the downforce at the base portion 107 and to send the measured downforce to the controller 114. The wing actuator 125 is operably connected to the controller 144 and is moveable between an extended position and a retracted position to adjust the wing frame 118 at the direction of the controller 144. For example, when the wing actuator 125 is extended, the wing frame 118 rotates to move a rearward portion 127 of the wing frame 118 downward. When the actuator 125 is contracted, the wing frame 118 rotates to move the rearward portion 127 of the wing frame 118 upward. In other embodiments, the geometry of the machine may be different such that extension of the wing actuator 125 results in upward movement of the rearward portion 127 of the wing frame 118 and contraction of the wing actuator 125 results in downward movement of the rearward portion 127 of the wing frame 118.

Additionally, the downforce of the wing frame 118 may be adjusted by adjusting the pressure within the wing actuator 125. An increase in pressure within the wing actuator 125 causes the wing actuator 125 to extend, and a decrease in pressure within the wing actuator 125 causes the wing actuator to contract.

It should be appreciated that the rear end of the wing actuator 125 is above the axis of rotation of the wing frame 118, whereas the rear ends of the rotate frame actuators 122, 124 are below the axis of rotation of the rotate frame 110. Therefore, extension of the wing actuator 125 causes downward movement of the rearward-facing portion of the wing frame 118, and extension of the rotate frame actuators 122, 124 cause upward movement of the rearward portion of the rotate frame 110. With these arrangement-based differences in mind, the control methods described above with respect to the rotate frame 110 are also operable with respect to the wing frame 118. The control methods operable with respect to the wing frame 118 include, for example, control methods 150, 164, 178, 193, 206, 220 and other methods related thereto and described herein Control method 150 is described with respect to the wing frame 118 as an example of how a control method described above may be applied to the wing frame 118. Referring to control method 150, the position of the wing frame 118 is adjusted based on the position of the wing row unit 117.

Similar to step 152 of control method 150, a desired wing-to-arm angle is selected. The wing-to-arm angle is an angle defined between a rearward or rearward-facing portion of the wing frame 118 and the wing arm 119. Similar to step 154, an actual wing-to-arm angle is determined by the sensor 140. In the illustrative embodiment, the sensor 140 sends a position signal to the controller 144. In the illustrative embodiment, the position signal is indicative of (or may be used to calculate) the actual wing-to-arm angle. Similar to step 156, the controller 144 determines whether the actual wing-to-arm angle is equal to the desired wing-to-arm angle. If the actual wing-to-arm angle is equal to or within an acceptable range of the desired wing-to-arm angle, then the controller 144 will repeat the steps similar to steps 154 and 156.

If the actual wing-to-arm angle is outside the acceptable range, the control method proceeds to a step similar to step 158. At steps similar to steps 158 and 160, if the actual wing-to-arm angle is greater than the desired wing-to-arm angle, then the controller 144 will send a signal to the wing actuator 125 instructing the actuator to contract from a first position to a second position. Contraction of the actuators 125 moves the rearward end 127 of the wing frame 118 upward. This, in turn, decreases the actual frame-to-arm angle. After the actuator 125 has contracted to the second position, the wing-to-arm angle is equal to or within an acceptable range of the desired wing-to-arm angle. Referring to steps similar to steps 158 and 162, if the actual wing-to-arm angle is less than the desired wing-to-arm angle, then the controller 144 will send a signal to the actuator 125 instructing the actuator to extend from a first position to a second position. Extensions of the actuator 125 moves the rearward-facing end 127 of the rotate frame 118 downward. This, in turn, increases the actual wing-to-arm angle. After the actuator 125 has extended to the second position, the wing-to-arm angle is equal to or within an acceptable range of the desired wing-to-arm angle.

Referring to FIG. 11, another exemplary embodiment of an agricultural machine, such as a row crop planter 1000 is shown. The machine 1000 includes a main frame 1102 supported above the ground by wheels 1104 and/or tracks 1105, which are capable of moving the machine forwardly in the axial direction as shown by the arrow 106. The main frame 1102 may support one or more commodity containers such as the container 1108. The main frame 1102 is coupled to a rotate frame 1110 that extends laterally from a first lateral end 1112 to a second lateral end 1114. It should be appreciated that many aspects of the machine 1000 are identical to the machine 100 described herein; where aspects of the two embodiments are substantially identical, often times, the same reference number will be used to represent the identical aspects. Additionally, it should be appreciated that each control method described above with respect to the machine 100 may be operable with respect to the machine 1000. The control methods applicable to the machine 100 include, for example, control methods 150, 164, 178, 193, 206, 220 and other methods related thereto and described herein.

The machine 1000 differs from the machine 100 in that the machine 1000 includes multiple groups of commonly-sized actuators configured to cooperatively adjust the rotate frame (or rock shaft) 1110. The multiple groups of commonly-sized actuators may be extended or contracted to adjust the position or downforce of the rotate frame 1110, as will be described in greater detail below. It should be appreciated that the rear ends of the rockshaft actuators are above the axis of rotation of the rockshaft 1110, whereas the rear ends of the actuators 122, 124 of rotate frame 110 are below the axis of rotation of the rotate frame 110. Therefore, extension of the rockshaft actuators cause downward movement of the rearward-facing portion of the rockshaft, and extension of the actuators 122, 124 of the rotate frame 110 cause upward movement of the rearward portion of the rotate frame 110. With these arrangement-based differences in mind, the control methods described above with respect to the rotate frame 110 are also operable with respect to the rotate frame 1110.

In the illustrative embodiment shown in FIG. 11, the rotate frame 1110 includes a center frame section 1116, a pair of outer frame sections 1118, 1120, and a pair of intermediate frame sections 1122, 1124 each disposed between the center frame section 1116 and one of the outer frame sections 1118, 1120. Each group of commonly-sized actuators is configured to adjust a different section of the rotate frame 1110. A group of commonly-sized actuators 1126 is configured to adjust the outer frame section 1118. In the illustrative embodiment, the group of commonly-sized actuators 1126 includes three actuators. A group of commonly-sized actuators 1128 is configured to adjust the outer frame section 1120. In the illustrative embodiment, the group of commonly-sized actuators 1128 includes three actuators. A group of commonly-sized actuators 1130 is configured to adjust the center frame section 1116. In the illustrative embodiment, the group of commonly-sized actuators 1130 includes two actuators. A group of commonly-sized actuators 1132 is configured to adjust the intermediate frame section 1122. In the illustrative embodiment, the group of commonly-sized actuators 1132 includes one actuator. A group of commonly-sized actuators 1134 is configured to adjust the intermediate frame section 1124. In the illustrative embodiment, the group of commonly-sized actuators 1134 includes one actuator.

Control method 150 is described with respect to the machine 1000 as an example of how a control method described above may be applied to the machine 1000. FIG. 4 illustrates a control method 150 used to adjust the rotate frame 1110, wherein the position of the rotate frame 1110 is adjusted based on the position of the row units 116. According to the method 150, at step 152, a desired frame-to-arm angle is selected. A user may input a desired frame-to-arm angle into the operator control system, or the desired frame-to-arm angle may be predetermined (and pre-set) based on the type of machine and application in use. At step 154, the actual frame-arm-angle 142 is determined by the sensor 140 described above. In the illustrative embodiment, the sensor 140 sends a position signal to the controller 144. In the illustrative embodiment, the position signal is indicative of (or may be used to calculate) the actual frame-to-arm angle 142. At step 156, the controller 144 determines whether the actual frame-to-arm angle 142 is equal to the desired frame-to-arm angle. If the actual frame-to-arm angle 142 is equal to or within an acceptable range of the desired frame-to-arm angle, then the controller 144 will repeat steps 154 and 156.

Referring again to step 156, if the actual frame-to-arm angle 142 is outside the acceptable range, the control method proceeds to step 158. At steps 158 and 160, if the actual frame-to-arm angle 142 is greater than the desired frame-to-arm angle, then the controller 144 will send a signal or signals to the multiple groups of actuators 1126, 1128, 1130, 1132, 1134 instructing the actuators to contract from respective first positions to second positions. Contraction of the actuators 1126, 1128, 1130, 1132, 1134 moves a rearward end 1129 of the rotate frame 110 upward. This, in turn, decreases the actual frame-to-arm angle 142. After the actuators 122, 124 have contracted to the respective second positions, the frame-to-arm angle 142 is equal to or within an acceptable range of the desired frame-to-arm angle. Referring to steps 158 and 162, if the actual frame-to-arm angle 142 is less than the desired frame-to-arm angle, then the controller 144 will send a signal or signals to the actuators 1126, 1128, 1130, 1132, 1134 instructing the actuators to extend from respective first positions to second positions. Extension of the actuators 1126, 1128, 1130, 1132, 1134 moves the rearward end 1129 of the rotate frame 110 downward. This, in turn, increases the actual frame-to-arm angle 142. After the actuators 1126, 1128, 1130, 1132, 1134 have extended to the respective second positions, the frame-to-arm angle 142 is equal to or within an acceptable range of the desired frame-to-arm angle.

In some cases, the controller 144 sends different signals to each group (or to some of the groups) of commonly-sized actuators 1126, 1128, 1130, 1132, 1134. Thus, each group of commonly-sized actuators is instructed to move simultaneously, albeit with different amounts of movement for different groups of actuators, such that the entire lateral length of the rearward portion 1129 of the rotate frame 1110 is adjusted. In this instance, the actuators 1126 and 1128 receive a first signal with instructions to extend and contract the same amount as one another, as the actuators 1126 and 1128 are all commonly-sized. The actuators 1132 and 1134 receive a second signal with instructions to extend and contract the same amount as one another, as the actuators 1126 and 1128 are all commonly-sized. The actuators 1132 and 1134 are differently sized than the actuators 1126 and 1128. Additionally, the actuators 1130 receive a third signal with instructions to extend and contract the same amount as one another, as the actuators 1130 are all commonly-sized. The actuators 1130 are differently sized than the actuators 1132 and 1134 and the actuators 1126 and 1128.

In some cases, the controller 144 may send different signals to selected groups of one of more commonly-sized actuators, and send no signal to other groups of commonly-sized actuators. Thus, only selected groups of commonly-sized actuators will adjust the positions or downforces of their respective lateral sections of the rotate frame 1110. Depending on the signal(s) received from the controller 144, the different groups of commonly-sized actuators may adjust their respective section of the rotate frame 1110 by the same amount or by different amounts. This is because the topography and soil composition may differ over the lateral length of the machine 1000 such that different operating positions or downforces may be required for different lateral section of the rotate frame 1110 and for the row units 116 attached thereto.

While operation of the machine 1000 has only been described with respect to the control method 150, it should be appreciated that each of the additional control methods described herein are also applicable to the machine 1000. Where extension and pressure increases are discussed with respect to the rotate frame actuators of the machine 100, contraction and pressure decreases shall be substituted in when applying the control methods to the machine 1000.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for an agricultural machine including a main frame, a rotate frame coupled to the main frame, and a row unit coupled to the rotate frame, the method comprising:
    (g) selecting a desired frame-to-arm angle defined between a rearward portion of the rotate frame and an arm extending between the rearward portion of the rotate frame and the row unit;
    (h) determining an actual frame-to-arm angle defined between the rearward portion of the rotate frame and the arm;
    (i) adjusting a downforce exerted by the rotate frame on the row unit based on the position of the arm relative to the rotate frame;
    (j) selecting a desired row unit downforce that is exerted by the row unit on the soil;
    (k) determining the actual row unit downforce that is exerted by the row unit on the soil; and
    (l) adjusting the actual row unit downforce toward the desired row unit downforce;
    wherein steps (k) and (l) collectively are completed at a faster rate than are steps (h) and (i) collectively.

2. The method of claim 1, wherein adjusting a downforce exerted by the rotate frame on the row unit includes:
    decreasing the rotate-frame downforce when the actual frame-to-arm angle is greater than the desired frame-to-arm angle; and increasing the rotate-frame downforce when the actual frame-to-arm angle is less than the desired frame-to-arm angle.

3. The method of claim 1, wherein adjusting a downforce exerted by the rotate frame on the row unit based on the position of the arm relative to the rotate frame includes:
    sending a first downforce signal to a first group of one or more actuators coupled to the rotate frame and the main frame; and
    adjusting the pressure within actuators of the first group of one or more actuators from a first pressure to a second pressure based on the downforce signal.

4. The method of claim 3, wherein at the first pressure the actual frame-to-arm angle is not equal to or within an acceptable range of the desired frame-to-arm angle, and at the second pressure the actual frame-to-arm angle is equal to or within an acceptable range of the desired frame-to-arm angle.

5. The method of claim 4, wherein adjusting a downforce exerted by the rotate frame on the row unit based on the position of the arm relative to the rotate frame further includes:
    sending at least one additional downforce signal to a corresponding at least one additional group of one or more actuators coupled to the rotate frame and the main frame; and
    adjusting the pressure within actuators of the at least one additional group of one or more actuators from a third pressure to a fourth pressure based on the at least one additional downforce signal.

6. The method of claim 5, wherein at the third pressure the actual frame-to-arm angle is not equal to or within an acceptable range of the desired frame-to-arm angle, and at the fourth pressure the actual frame-to-arm angle is equal to or within an acceptable range of the desired frame-to-arm angle.

7. A method for an agricultural machine including a main frame, a rotate frame coupled to the main frame, and a plurality of row units coupled to the rotate frame along a lateral length of the rotate frame, the method comprising:
    selecting a desired row unit downforce that is exerted by each row unit of the plurality of row units;
    determining, from the desired row unit downforce for each row unit of the plurality of row units, a total desired downforce;
    determining, from an actual row unit downforce exerted by each row unit of the plurality of row units to the ground, a total accumulated downforce;
    adjusting, based on a result of a comparing of the total accumulated downforce to the total desired downforce, a rotate frame downforce that is exerted by the rotate frame;
    wherein adjusting the rotate frame downforce that is exerted by the rotate frame includes pivoting the rotate frame relative to the main frame to adjust the downforce of the plurality of row units, the main frame being supported above the ground by ground engaging mechanisms configured to propel the agricultural machine along the ground.

8. The method of claim 7, further comprising:
    selecting a maximum downforce limit of a row unit of the plurality of row units.

9. The method of claim 8, further comprising:
    rotating a rearward portion of the rotate frame upward if the actual row unit downforce of the row unit is greater than the maximum downforce limit of the row unit.

10. The method of claim 7, further comprising:

selecting a minimum downforce limit of a row unit of the plurality of row units.

11. The method of claim 10, further comprising:

moving at least the rearward portion of the rotate frame downward if the actual row unit downforce of the row unit is less than the minimum downforce limit of the row unit.

12. An agricultural machine comprising:

a main frame supported above the ground by ground engaging mechanisms configured to propel the agricultural machine along the ground;

a rotate frame pivotably coupled to the main frame;

an actuator having a first end coupled to the main frame and a second end coupled to the rotate frame;

a row unit coupled to the rotate frame and configured to deliver commodity to the soil;

a linkage assembly including an arm having a first end pivotably coupled to the rotate frame and a second end pivotably coupled to the row unit;

a sensor configured to identify a position of the arm;

a downforce gauge configured to determine the downforce exerted by the row unit;

a controller configured to: (i) send a first signal to the actuator causing adjustment of the downforce exerted by the rotate frame on the row unit based on the position of the arm and (ii) send a second signal to the actuator causing adjustment of the actuator based on the downforce exerted by the row unit, wherein the adjustment of the actuator in response to the second signal is implemented faster than the adjustment of the downforce in response to the first signal.

13. The agricultural machine of claim 12, wherein the actuator is included in a first group of one or more actuators each having a first end coupled to the main frame and a second end coupled to the rotate frame;

wherein the controller is configured to send the first signal to each actuator of the first group of one or more actuators to adjust the pressure within each actuator of the first group of one or more actuators from a first pressure to a second pressure to cause movement of the rotate frame from a first position to a second position.

14. The agricultural machine of claim 13, further comprising:

a second group of one or more actuators each having a first end coupled to the main frame and a second end coupled to the rotate frame;

wherein the controller is configured to send a third signal to each actuator of the second group of one or more actuators to adjust the pressure within each actuator of the second group of one or more actuators from a third pressure to a fourth pressure to cause movement of the rotate frame from the first position to the second position.

15. The agricultural machine of claim 14, further comprising:

a third group of one or more actuators each having a first end coupled to the main frame and a second end coupled to the rotate frame;

wherein the controller is configured to send a fourth signal to each actuator of the third group of one or more actuators to adjust the pressure within each actuator of the third group of one or more actuators from a fifth pressure to a sixth pressure to cause movement of the rotate frame from the first position to the second position.

* * * * *